June 6, 1967  G. R. SPRENGLING ET AL  3,323,962
REINFORCED RESINOUS TUBULAR LAMINATES
Filed Oct. 25, 1963
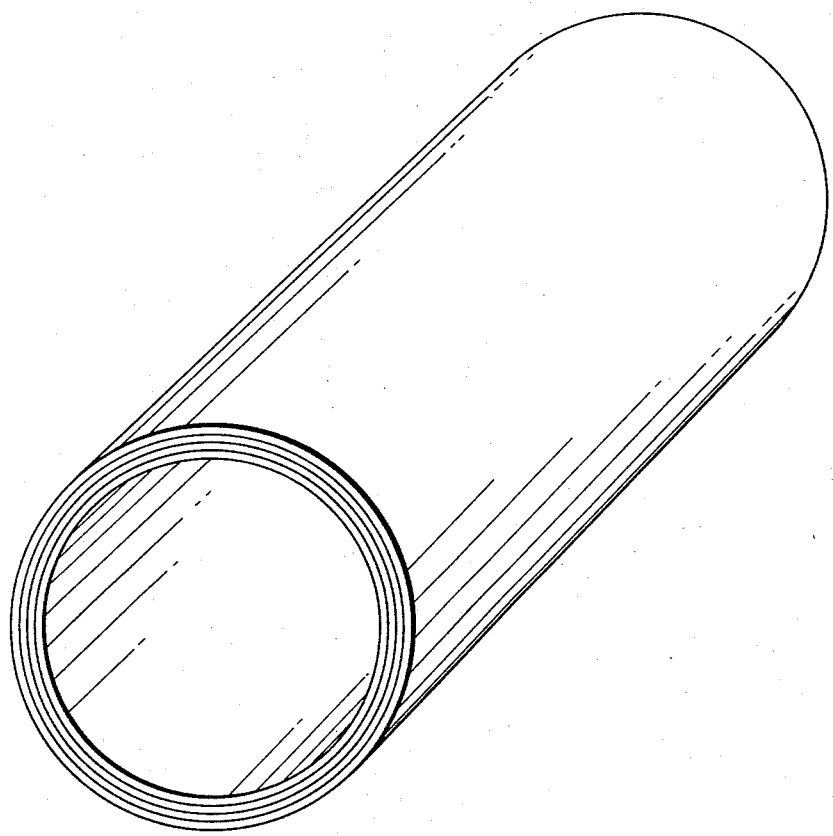
WITNESSES:
John L. Chopp
James T. Young
INVENTORS
Gerhard R. Sprengling
and Louis A. Cargnel
BY
H. F. Towle
ATTORNEY

3,323,962
REINFORCED RESINOUS TUBULAR LAMINATES
Gerhard R. Sprengling, Blairsville, and Louis A. Cargnel, Latrobe, Pa., assignors to Westinghouse Electric Corporation, Pittsburgh, Pa., a corporation of Pennsylvania
Filed Oct. 25, 1963, Ser. No. 318,903
11 Claims. (Cl. 156—184)

The present invention relates to a novel class of reinforced resinous laminates. More particularly, the invention relates to reinforced resinous tubular laminates characterized by outstandingly improved thermal stability and electrical properties. The invention relates both to the tubular members and to the method of their manufacture.

Reinforced resinous tubular members have been employed in a number of uses where physical strength and/or electrical insulating properties are required. For example, barrier tubes are employed in dry-type transformers partly as mechanical supports for the coils during winding and service, but chiefly as a dielectric barrier against electrical overload stresses. In order to obtain sufficient mechanical strength, such tubes have usually been made from a web of reinforcing material impregnated with a thermosetting resin in the B-stage and wound on a hot mandrel under tension, and then post-cured.

In the higher temperature transformers (Classes F and H) the reinforcing material must almost inevitably be composed of asbestos or glass fiber in cloth, paper, mat form or the like. The presence of this reinforcing material, although necessary for mechanical strength, is deleterious to desired electrical strength in an alternating current field. This is so because the reinforcing material has two or more times the dielectic constant of the available resins, which throw the electrical stresses predominately upon the resin portion of the aggregate. Furthermore, voids and cracks deleterious to electric strength tend to form at the interface between resin and reinforcement. These form due to evolution in gaseous form of condensation products of the resin and/or solvent during the rolling and curing of the tube on a mandrel.

Inasmuch as positive pressure of any significant magnitude cannot be applied to a tube in the rolling and curing process, the problem of void formation is far more acute than in flat laminates, where external pressure helps to keep evolved volatiles in condensed form. The magnitude of the effect on electric strength (essentially "impulse" or "rapid rise" strength in an AC field is intended) can be assessed from the fact that, whereas solid resins such as polystyrene will show electric strength of 650–1000 volts per mil at approximately ⅛ inch thickness under normal testing conditions, the aggregates usable for barrier tubes, especially those with glass or asbestos reinforcement, yield strengths of only 300–400 volts per mil at best under the same conditions. The difference has been largely due to defects in the electrical sense in the latter materials.

These defects are also deleterious to the endurance of such materials at high temperatures in air. This is because such defects admit air to the interior of the structure. In a typical organic resin the rate of air oxidation at high temperatures may be several orders of magnitude higher than the rate of purely thermal degradation (in the absence of oxygen). The useful thermal stability of such materials, therefore, depends on a structure free enough of defects to exclude air as far as possible. The ordinary method of meeting these difficulties is by permitting the B-stage resin intended for tube rolling to retain considerable flow. Thus, the bubbles of gaseous volatile material are intended to have a chance to escape before the resin finally hardens. That they do not do so effectively is demonstrated by the low electric strengths generally obtained.

It is a principal object of the invention to provide a greatly improved reinforced resinous tubular member characterized by high electric strength and outstanding physical properties.

Another object of the invention resides in the novel method of manufacturing reinforced resinous tubular members.

A further object of the invention resides in the provision of a web of reinforcing material in which the resin is essentially completely cured and has lost all, or substantially all, of its volatile materials prior to manufacture of the tubular member.

Other objects of the invention will become apparent from the following description thereof. The description will be given with particular reference to the drawing in which the figure is a view, in perspective, of a reinforced resinous tubular member prepared according to the invention.

It has now been found that greatly improved tubular members may be made by employing a procedure diametrically opposed to the prior art treatment described above. In carrying out the invention, there is applied to a web of reinforcing material in one or more coats in a treating tower, from about 80% to about 95% of the resin that the web will ultimately contain. The temperature and time of treatment in the tower are regulated so that the resin material is essentially completely cured or condensed, i.e., has lost substantially all of the volatile materials produced in the condensation reaction. There is then applied to the so treated material a further, very thin cement coat of resin which is cured in the tower at a much lower temperature and/or for a shorter time to advance it to the fusible B-stage. In this condition, the resinous material will still flow at the temperatures to be used in tube rolling. In this manner it is insured that as small an amount of volatile material as possible remains to be evolved during the tube rolling treatment where it might serve as a cause for defect formation.

In order to decrease the chance for void or other defect formation still further, it is preferred to supply heat to the tube as it is being rolled, not only from the mandrel upon which it is rolled, but also from a heated shield or mangle partly surrounding the tube and the mandrel. This method of treatment ensures that each layer of material laid down will evolve as much of its remaining volatiles as possible before these can be trapped by the next layer applied thereover.

A critical feature of the invention resides in the selection of the resinous materials employed in producing the tubes. Specifically, these resins are derived from diphenyl oxide as disclosed in copending application Ser. No. 193,943 to G. R. Sprengling et al, filed May 11, 1962. The resins are polymeric diphenyl ether compositions having the general formula

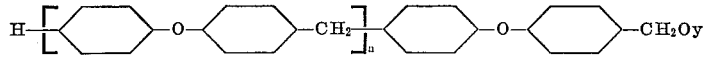

where y is a lower alkyl substituent having 1 to 4 carbon atoms and n is an integer of about 1 to about 9.

It will be seen from the foregoing formula that the connecting methylene linkages between the diphenyl ether components derive from the presence, in the monomeric compounds, of one or more alkoxymethyl substituent groups on the diphenyl ethers. The presence of the alkoxymethyl groups, in terms of percentage by weight, are preferably within the limits of about 12 to about 32 in order to provide polymeric compositions characterized by their outstanding thermal stability. The most economical monomers contain methoxymethyl groups and are therefore preferred. However, in the stead of the —$CH_2OCH_3$ groups, it should be understood that it is entirely possible to employ functional groups —$CH_2OY$ where $y$ is an aliphatic or substituted radical greater in size than —$CH_3$ and preferably not greater than —$C_4H_7$.

It is also to be understood that in place of the above-described diphenyl oxide it is possible to employ higher homologs thereof having the empirical formula

where $n$ may be any whole number but is commonly from 1 to 3.

Alternatively, it may be desirable to employ as a basic molecule, instead of the diphenyl oxide itself, a thermoplastic polymer thereof having the general formula

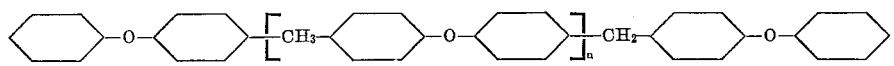

It was entirely unexpected that, for example, the methoxymethyl groups —$CH_2OCH_3$ would serve as functional members inasmuch as most ethers are considered to be inert. However, it was found that in the presence of relatively mild catalysts, these substituent groups react with ring hydrogen atoms on other diphenyl oxide molecules to yield a polymer. A desirable feature of the reaction resides in the fact that the only volatile given off during the condensation polymerization reaction is methanol which is relatively innocuous to equipment and to the properties of the resin produced.

The catalysts which may be employed to carry the reaction from the monomers to "B-stage" and thence to the final, thermoset polymer are of four general types: (1) Friedel-Crafts catalysts such as $AlCl_3$, $ZnCl_2$, $BF_3$, etc.; (2) solids such as silica, diatomaceous earths, bentonites, etc.; (3) some metals in the form of their organic soluble chelates, notably ferric acetyl acetonate; and (4) soluble acids such as p-toluene sulfonic acid.

(Catalysts in groups (2) and (3) generally require that some HCl be present as a co-catalyst or accelerator.) The requisite amount of HCl is within the range of about 0.1% to about 1.0% by weight of the catalyst. However, HCl per se is not a catalyst for the reaction. Gaseous HCl may be added as an accelerator but the preferred method is to add an amount of chloromethyl diphenyl oxide to generate the desired amount of acid in situ. It is theorized that the effect of the HCl is only to change the group (2) or group (3) catalysts into Lewis acids falling in group (1). Thus, ferric acetyl acetonate may be converted to ferric chloride. Silica may have the HCl absorbed on its surface and iron or other metal present as an impurity will become available as ferric chloride.

There is no doubt that there is some correlation between impurities present on or in the solid catalysts of group (2) and their activity. The catalysts of groups (1) and (4), however, do not require any co-catalyst or accelerator. The catalysts may be employed in amounts of about 0.08% to about 20% of the weight of monomer depending on the particular one employed.

In preparing the polymeric resinous compositions to be employed in the invention, the desired amount of methoxymethyl diphenyl oxide (hereinafter termed MMDPO) is charged to a suitable reaction vessel and the required amount of catalyst is added thereto. The reaction mixture is heated to about 90°–140° C. until the reaction product reaches a viscosity of about 3,000–5,000 centipoises at 90°–105° C. At a temperature of, for example, about 105° C. the reaction is complete after about 3–7 hours i.e. about 80–90% of the reactive methoxymethyl groups have reacted to form essentially methylene bridges. Temperatures below about 90° C. promote the reaction too slowly to be practicable. On the other hand, at temperatures above about 140° C. the reaction is so rapid that it is uncontrollable in most conventional equipment. Resins prepared as above will have, upon dilution, average gel times at 150° C. of about 3–8 minutes.

The resinous reaction products are soluble in various organic solvents such as toluene, benzene, xylene, high-flash naphtha, and the like, including chlorinated aromatics and aliphatics.

In use, the products may be cured to final thermoset condition by the action of heat alone, or by heat and pressure as in the case of laminating treatments. Temperatures of the order of about 150° C. to about 200° C. or higher are normally employed. The final cured polymers are outsanding in their thermal stability, electrical insulating properties, and bond strength.

In making a barrier tube a diphenyl oxide polymer, such as described above, containing 10% of 5-micron silica catalyst is bodied at about 100–150° C. without solvent to a viscosity of about 2000–4000 centipoises at 105° C. The resin is then diluted with toluene (or another appropriate solvent) to a viscosity sufficiently high to give a desired thick coat on glass in one pass, for example, to about 60–65% solids. This resin is then coated on, for example, electrical grade glass cloth (such as #116 cloth) in a conventional treating tower. Where, for example, the glass to be treated is 4 mils thick, the varnish viscosity may be adjusted to give a final thickness of about 6–10 mils, or 1 to 3 mils on each surface, in one pass without causing sags or runs.

The resin impregnated glass cloth is passed through the treating tower at 200–250° C. for about 15–45 minutes which cures the resin essentially completely. The so-treated material is then coated in a second pass with a solution of the same resin diluted to a viscosity such that about ¼–½ mil of additional resin is deposited on each surface thereof. This, in turn, is cured at a lower temperature such as 100–150° C. and for a shorter time such that the resin in this cement coat will be hard and dry at room temperature but will still flow at the tube rolling temperatures.

The so-treated material, or prepreg, is then rolled into a tube on a mandrel heated to about 200° C. preferably supplied with an external heater extending part way around but not touching either mandrel or the tube being rolled. The air temperature at the external surface of the tube during rolling is preferably about 200–260° C. The tube rolling device is equipped with a dancing roll or other device to equalize tension across the web being rolled. The finished tube is stripped from the mandrel while hot and finish cured in an oven at 250° C. without appreciable distortion in post cure. The tube is normally post cured for about three hours at 200° C. plus 12 hours at 250° C.

Tubes made with the above-described resins and by the methods cited above using #116 glass cloth with a #112 finish (bare glass have been found to have the following properties. (1) Electric strength ranging from 1000 to 1300 volts per mil at a 7–10 mil thickness and 800–1000 volts per mil at $\frac{1}{16}$ inch thickness to about 700 volts per mil at ⅛ inch thickness. (2) Electric strength at 150° C. is no lower than at room temperature. The 60-cycle power factor (100× loss tangent) at 25° C. ranges from 0.18% to about 6.0%, depending on the exact condition of manufacture. The power factor at 200° C. generally ranges from 4.0 to 6.0% or very little higher than the room temperature loss.

Specifically, a tube prepared according to the invention and as illustrated in the drawing and having 0.18% loss at 25° C. was found to have 0.43% loss at 150° C. (3) The dielectric constant lies within the range of about 4.0 to 5.2 over all temperatures up to 200° C. (4) Impulse strength (1.5×40 microseconds) approximately equals the crest value of the electric strength for an impulse ratio of 1. (5) Flexural strength of samples cut from these tubes ranges from about 30,000 to 35,000 p.s.i. at room temperature after the normal post cure treatment. The flexural strength at 200° C. after post cure is about 6,000 p.s.i. but rises to 12,000 p.s.i. after 15 hours and up to 20,000 p.s.i. after 40 hours further cure at 300° C. (6) The compressive strength of a 4 inch section of 3 inch outer diameter tube with a 1/16 inch wall falls within the rage of 9,000–10,000 p.s.i. Using a failure criterion of 200 volts per mil on a 1/16 inch wall, these tubes have a 100,000 hour extrapolated life temperature in air ranging from 180° C. to 225° C. By comparison, the prior art tubes employing a silicone resin barrier rate only 165° C. life temperature in the same test.

The thermal life of the above-described novel tubular members in inert atmospheres such as $N_2$, $SF_6$ or $C_3F_8$ is many times longer than that cited above. Mechanical creep in such tubes at 250° C. was found to be negligible, and solvent resistance excellent (not affected by boiling toluene).

What is claimed is:

1. A process for preparing a reinforced resinous tubular laminate comprising the steps of (A) applying to a fiber sheet a first relatively thick coating of a resinous composition having the general formula

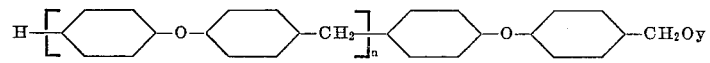

where $n$ is an integer of 1 to about 9 and $y$ is a lower alkyl substituent having 1–4 carbon atoms, (B) heating the resin-treated sheet until the resinous coating is essentially condensed and substantially all of the volatile matter of the condensation reaction has been removed, (C) applying to the resin-treated sheet a second relatively thin coating of said liquid resinous composition, (D) heating the so-treated sheet until the second layer of the resinous composition is advanced to a fusible stage that is dry to the touch, (E) winding said treated sheet on a mandrel to form a tubular laminate having the desired thickness, (F) heating said tubular laminate until the second layer of resinous material is completely cured.

2. The process of claim 1 wherein the first coating (A) is applied in multiple steps.

3. The process of claim 1 wherein the fiber sheet is fiber glass and the thickness of the first coating (A) is about 1 to about 3 mils on each surface of the sheet and the thickness of the second coating (C) is about 1/4 to about 1/2 mil on each surface of the sheet.

4. The process of claim 1 wherein the heating steps (B) is carried out at a temperature up to about 250° C. for a period of time up to about 45 minutes.

5. The process of claim 1 wherein the heating step (F) is carried out at a temperature up to about 250° C. for a period of about 15 hours.

6. The process of claim 1 wherein $y$ is —$CH_3$.

7. The process of claim 1 wherein the treated sheet is simultaneously heated and wound on a heated mandrel.

8. The process of claim 1 wherein the resinous coating (A) is applied in an amount to provide from about 80% to about 95% of the total ultimate resin in the laminate.

9. A resin impregnated fibrous material suitable for making laminates comprising a fiber sheet, a first relatively thick resinous coating deposited on the sheet, the first coating being an essentially completely condensed product of a composition having the general formula

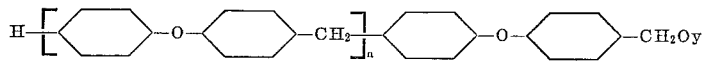

where $n$ is an integer of 1 to about 9 and $y$ is an alkyl substituent having 1–4 carbon atoms and a second relatively thin resinous coating deposited over the first coating, the second coating being the dry fusible product of a composition having said general formula.

10. The fibrous material of claim 9 in which the fiber sheet is a glass fiber sheet, the first coating has a thickness of about 1 to about 3 mils, on each surface of the sheet, and the second coating has a thickness of about 1/4 to 1/2 mil, on each surface of the sheet.

11. The fibrous material of claim 9 in which $y$ in the general formula of the composition is —$CH_3$.

References Cited
UNITED STATES PATENTS

| | | | |
|---|---|---|---|
| 2,801,945 | 8/1957 | Rogers, et al. | 138—141 |
| 2,911,380 | 11/1959 | Doedens | 260—2.5 |
| 3,082,185 | 3/1963 | Doedens | 260—37 |
| 3,099,293 | 7/1963 | Lakritz et al. | 138—141 |
| 3,170,959 | 2/1965 | Trapp | 260—613 |
| 3,274,157 | 9/1966 | Doedens | 260—47 |

FOREIGN PATENTS

| | | |
|---|---|---|
| 632,201 | 9/1963 | Belgium. |

LAVERNE D. GEIGER, *Primary Examiner.*

T. MOORHEAD, *Assistant Examiner.*